United States Patent
Eichmeyer et al.

(10) Patent No.: US 12,223,099 B2
(45) Date of Patent: Feb. 11, 2025

(54) UNUSED REDUNDANT ENABLE DISTURB PROTECTION CIRCUIT

(71) Applicant: Micron Technology, Inc., Boise, ID (US)

(72) Inventors: Seth A. Eichmeyer, Boise, ID (US); Christopher G. Wieduwilt, Boise, ID (US); Matthew D. Jenkinson, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 351 days.

(21) Appl. No.: 17/706,410

(22) Filed: Mar. 28, 2022

(65) Prior Publication Data

US 2023/0315918 A1     Oct. 5, 2023

(51) Int. Cl.
  *G11C 29/08*    (2006.01)
  *G06F 21/79*    (2013.01)
  *H03K 19/20*    (2006.01)

(52) U.S. Cl.
  CPC .............. *G06F 21/79* (2013.01); *G11C 29/08* (2013.01); *H03K 19/20* (2013.01)

(58) Field of Classification Search
  CPC .......... G06F 21/79; G11C 29/08; H03K 19/20
  See application file for complete search history.

(56) References Cited

U.S. PATENT DOCUMENTS

| | | | |
|---|---|---|---|
| 2006/0039210 A1* | 2/2006 | Blodgett | G11C 17/16 365/200 |
| 2015/0135038 A1* | 5/2015 | Wilson | G11C 29/76 714/773 |

* cited by examiner

*Primary Examiner* — Michael Krofcheck
*Assistant Examiner* — Janice M. Girouard
(74) *Attorney, Agent, or Firm* — Perkins Coie LLP

(57) ABSTRACT

A memory device includes a plurality of fuse banks for a memory region. Each fuse bank stores bit information that relates to at least one of a default address for the plurality of fuse banks or an address of a memory cell that is defective. A default address protection circuit is configured to provide a default address status signal indicating whether a fuse bank in the plurality of fuse banks is storing bit information that corresponds to both the default address and an address of a memory cell that is defective. The memory device include a no_match circuit that overrides a repair of the external memory address if the external address matches the default address and if the default address status signal indicates that no fuse bank is storing bit information that corresponds to both the default address and an address of a memory cell that is defective.

20 Claims, 6 Drawing Sheets

UNUSED REDUNDANT ENABLE DISTURB PROTECTION CIRCUIT

TECHNICAL FIELD

The disclosed embodiments relate to memory devices. More particularly, this invention relates to memory devices that include protection circuits directed to preventing inadvertent activation of memory cell repairs.

BACKGROUND

A memory device can include a semiconductor substrate with one or more memory cell arrays and supporting logic circuits located on the peripheral area adjacent the memory cell arrays. The logic circuits can include, for example, control and addressing circuits, line driver circuits, sense amplifier circuits, and other supporting circuitry for operating and communicating with the memory cell arrays. The logic circuits can also include memory repair circuits for repairing memory cells that have been damaged and identified prior to shipment. However, after shipment to the customer, memory operation fails due to latch disturb events can be a major concern in the DRAM industry. For example, a latch disturb event can occur due to a single event upset, which is a change of state caused by one single high-energy particle (ion, electron, photon, neutron, etc.) striking a sensitive node in a micro-electronic device such as, for example, semiconductor memory. Such failures can be very costly to customers because the memory device can experience erroneous operation or fail entirely. Latch disturb events can toggle (flip) the state of logic circuits that include, for example, fuses, anti-fuses, and/or other non-volatile memory and/or corresponding latch circuits. In some situations, damage from latch disturb events cause memory operations (e.g., read and/or write operation) to erroneously use a column and/or row in a memory array area meant for repaired memory cells instead of a column/row in the main (normal) memory area. Such erroneous operations can occur if a circuit (e.g., a redundant enable circuit) changes state and causes the memory device to perform a duplicate repair, to overwrite customer data with garbage data, and/or to have a complete failure. In addition to single event upsets, latch disturb events can also occur due to nicked fuses, fuses that are blown accidentally, process marginality, system environment electrical upset, etc. For example, a fuse that is nicked (e.g., due to an unsuccessful intent to blow a fuse) on a redundant enable circuit can be a quality concern if it is not detected or accounted for. A nicked fuse can indicate an "open" state (e.g., fuse is blown) during an initial diagnostic test (and thus pass factory diagnostics) but then indicate a "closed" state during normal operation and/or provide an unintended path to another logic circuit when the operating voltages and other operating parameters (e.g., temperature of the device) during normal device operation are different. Similar issues can exist with anti-fuses and/or other non-volatile memory.

DETAILED DESCRIPTION

Figure 1A:
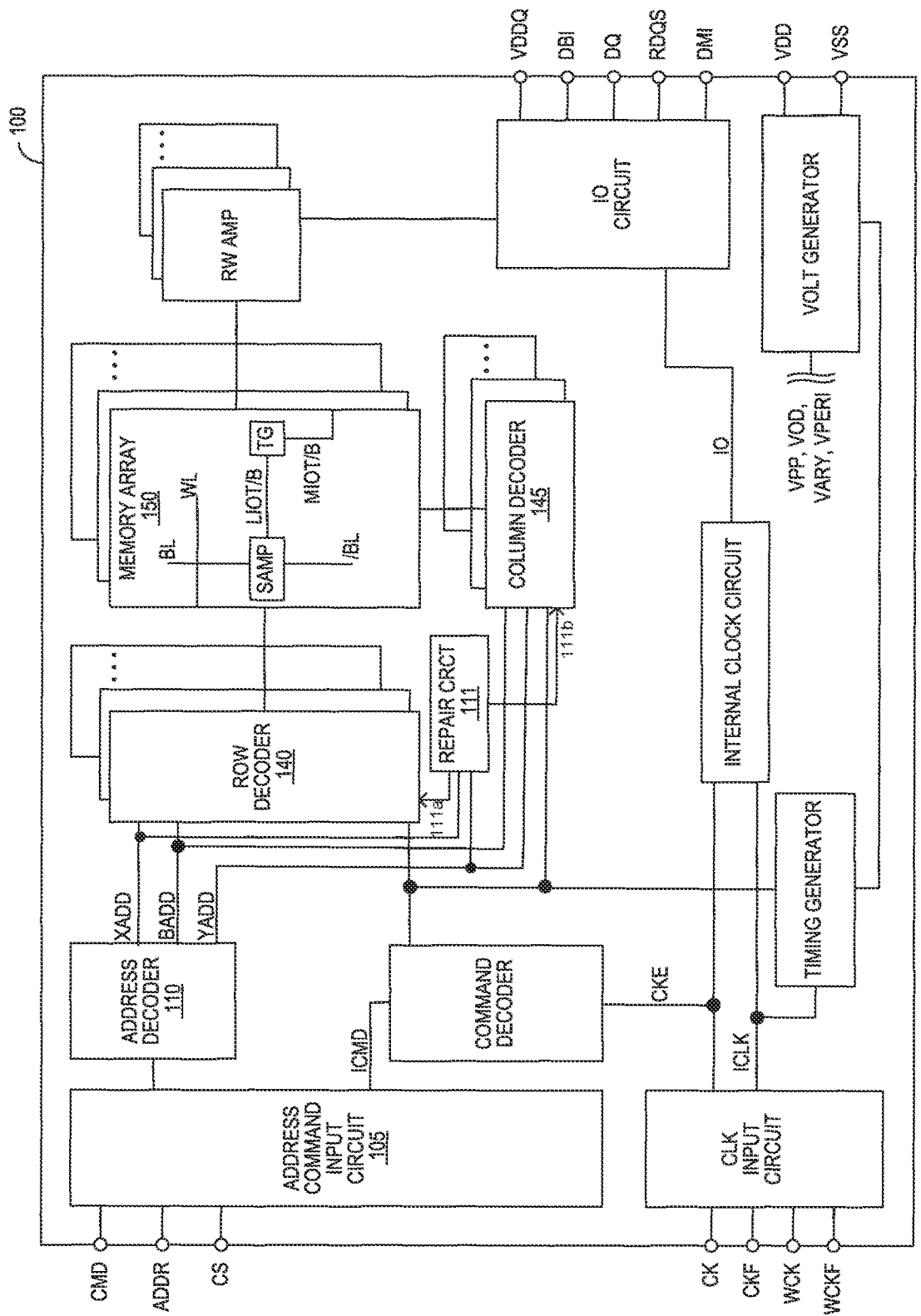
FIG. 1A is a block diagram of an example memory device in accordance with an embodiment of the present technology.

Memory devices (e.g., random-access memory (RAM), such as dynamic RAMs (DRAMs), including 3-D RAM and DRAM) typically include one or more arrays of memory cells, which store data, on a substrate (e.g., of a die). Some memory devices can include circuits configured to repair damaged memory cells and typically include a plurality of memory cells and redundant memory cells (e.g., spare rows and/or columns). Memory devices are tested for damaged rows and columns, for example, prior to shipping to a customer. The memory device can include one or more redundancy structures for storing addresses of damaged memory cells. If a portion of a primary row or column is damaged (e.g., damaged memory cell), a redundant (or replacement) row or column can be used to replace the damaged (or defective) row or column. This is known as "repairing." When a redundant row or column is used, the memory device is "programmed" to access a redundant (or replacement) memory cell of that redundant row or column instead of the damaged primary memory cell.

Memory cell programming usually occurs before the memory device is shipped to a customer. A test circuit and/or a testing sequence accessing memory bits can determine which memory cells, if any, have electrical issues—that is, which memory cells are damaged (also referred to herein as "defective"). The bit information relating to an address of the defective row and/or column can be programmed (stored) into non-volatile memory circuit, which is referred to herein as a fuse bank circuit or fuse bank. For example, each fuse bank can include to one or more address latch circuits. Each address latch circuit can represent a bit of the defective address and include, for example, a fuse or anti-fuse connected to a latch. In addition, a redundant enable circuit having a non-volatile memory circuit can be programmed to indicate that the corresponding programmed redundant column and/or row should be used instead of the defective row and/or column. Non-volatile memory circuits can include fusible links (fuses), anti-fuses, latches such as, e.g., dual integrated storage cell latch (DICE), and/or or other types of non-volatile memory. Fuses are integrated circuit components that are designed to break (or burn) when a relatively high current is selectively applied. This severs the connection between two points. Alternatively, anti-fuses are designed to connect two points. The memory device can have an array of fuse banks stored in an area of the memory device and each bit of the damaged memory address can correspond to a fuse or anti-fuse or other non-volatile memory circuit in the fuse bank. As discussed above, the programmed addresses (bit information) in the fuse banks can correspond to damaged row addresses and/or damaged column addresses. If, during operation of the memory device (e.g., memory operations such as read, write, etc.), the address (e.g., row address and/or column address) for the memory cell being accessed (also referred to herein as "external memory address") matches bit information (a programmed address) in the fuse bank and the corresponding redundant enable circuit indicates that the bit information is identified as being damaged, logic is set up such that the access to the damaged cell is redirected to a redundant memory cell (also referred to herein as "repair or repairing an external memory address"). Fuse bank addresses that have not been programed with a defective memory cell address remain at and/or are programmed to a default memory address (e.g., a default column address and/or a default row address). The default memory address can correspond to an address that is all zeros ("0s"), all ones ("1s"), or any combinations of ones and zeros. In some cases, a primary memory cell address corresponding to the default memory address may be defective. That is, a memory cell having a default address that is all zeros ("0s") or all ones ("1s") or another default address for the column and/or row is defective. In such a case, similar to the non-default address cases, the redundant enable circuit corresponding to that column and/or row address is set to indicate that the redundant memory cell should be used and not the primary memory cell.

The non-volatile memory design of a redundant enable circuit can vary from simple fuse or anti-fuse latch to more complex DICE circuits. Based on the type of circuit, the non-volatile memory can have different levels of protection with respect to latch disturb events, and/or some other problem that can cause a state change in the redundant enable circuit. For example, circuits having DICE can provide a more robust level of protection than a simple fuse-type latch circuit. However, the DICE-type circuits use more components and are more complex, which can lead to a larger memory logic area in the memory device. In addition, the DICE-type circuits may not be as economical as simple fuse or anti-fuse latch circuits. Thus, in conventional memory devices there is tradeoff between the level of protection from state changes and the size of the memory array area with respect to the design of unused redundant enable circuits. Accordingly, it would be beneficial to use simple non-volatile memory design (e.g., simple fuse and/or anti-fuse latch circuits) for the redundant enable circuits to keep memory device sizes to a minimum while maintaining a high level of protection from the adverse effects of state changes in redundant enable circuits.

It is estimated that in significant majority of cases where memory cells are repaired, a memory cell corresponding to the default column address and/or row address is not repaired. Accordingly, after the memory cell diagnostics have been completed, memory devices can have thousands of fuse banks that are not used (e.g., not programmed with defective memory cell addresses) and thus, there can be thousands of unused redundant enable circuits in the memory devices. In addition, it is estimated that, in the majority of cases involving flipped states in redundant enable circuits, an unused redundant enable circuit storing bit information relating to a default column/row address is changed from a "no repair" state to a repair state. An inadvertent erroneous change of state in the unused redundant enable circuits is referred to herein as an "unused redundant enable disturb." Accordingly, when there is an unused redundant enable disturb, the memory repair circuit can cause the memory device to perform a duplicate repair, to overwrite customer data with garbage data, and/or to completely fail. In exemplary embodiments of the present technology, a memory device can include an unused redundant enable protection circuit (also referred to herein as "default address protection circuit") in combination with a no_match circuit to force a no match signal (or override signal) that prevents a repair of the external memory address (e.g., prevents a memory operation form using a redundant column and/or row instead of the primary column and/or row during the memory operation).

In exemplary embodiment of the present disclosure, a memory device can include one or more fuse banks for a memory region. Each fuse bank can store bit information that relates to a default address for the plurality of fuse banks and/or an address of a memory cell that is defective. In some embodiments, the memory device can include a default address protection circuit that is configured to provide a default address status signal to indicate whether a fuse bank in the one or more fuse banks is storing bit information that corresponds to both the default address and an address of a memory cell that is defective. The memory device can also include a no_match circuit that is configured to receive an external memory address for memory operations and the default address status signal from the default address protection circuit. The no_match circuit can be configured to output a repair override signal that overrides a repair of the external memory address if the external address matches the default address and if the default address status signal indicates that no fuse bank in the plurality of fuse banks is storing bit information that corresponds to both the default address and an address of a memory cell that is defective.

In another embodiment of the present disclosure, a method includes storing bit information that relates to a default address for one or more fuse banks for a memory region and/or an address of a memory cell that is defective. The method also includes providing a default address status signal indicating whether a fuse bank in the plurality of fuse banks is storing bit information that corresponds to both the default address and an address of a memory cell that is defective. The method further includes overriding a repair of the external memory address in the memory device if an external memory address for memory operations matches the default address and if the default address status signal indicates that no fuse bank in the one or more banks is storing bit information that corresponds to both the default address and an address of a memory cell that is defective.

FIG. 1A is a block diagram of an example memory device 100 in accordance with an embodiment of the present technology. For example, the memory device 100 can include a DRAM or a portion thereof that includes one or more dies/chips. The memory device 100 can be connected to any one of a number of electronic devices capable of utilizing memory for the temporary or persistent storage of information, or a component thereof. For example, a host device of memory device 100 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to memory device 100; although in other embodiments, the host device may be indirectly connected to memory device (e.g., over a networked connection or through intermediary devices).

The memory device 100 can include an array of memory cells, such as memory array 150. The memory array 150 may include a plurality of banks, and each bank may include a plurality of word lines (WL), a plurality of bit lines (BL), and a plurality of memory cells arranged at intersections of the word lines and the bit lines. Memory cells can include any one of a number of different memory media types, including capacitive, magnetoresistive, ferroelectric, phase change, or the like. The selection of a word line WL may be performed by a row decoder 140, and the selection of a bit line BL may be performed by a column decoder 145.

The command terminals and address terminals may be supplied with an address signal and a bank address signal (not shown) from outside. The address signal and the bank address signal supplied to the address terminals can be transferred, via a command/address input circuit 105, to an address decoder 110. The address decoder 110 can receive the address signals and supply a decoded row address signal (XADD) to the row decoder 140, and a decoded column address signal (YADD) to the column decoder 145. The address decoder 110 can also receive the bank address signal and supply the bank address signal to both the row decoder 140 and the column decoder 145. The received addresses (e.g., row addresses, column addresses, etc.) can relate to memory operations (e.g., read, write, etc.) on a memory cell in memory array 150. Memory device operation is known to those skilled in the art and thus, for brevity, a detailed description is omitted except as needed to describe embodiments of the present disclosure.

The memory device 100 can include memory repair circuits such as, for example, repair circuit 111, which can be coupled to one or more address decoders, such as the address decoder 110, the row decoder 140, and/or the column decoder 145. For example, the repair circuit 111 can receive the row address XADD and/or the column address YADD, which can correspond to addresses received from an external system and/or generated internally (e.g., during a refresh procedure). The received XADD and/or YADD addresses can be respectively compared to known defective addresses. If there is a match, the repair circuit 111 can be configured to repair defects in storage cells. For example, a corresponding signal 111a or 111b can be sent to the respective row decoder 140 or the column decoder 145 to use redundant memory rows and/or columns instead of the main (or normal) rows and/or columns. That is, the repair circuit 111 can send the appropriate signals to replace defective memory cells with redundant memory cells in the memory array 150. As described in further detail below, the repair circuit 111 can include and/or be operatively connected to fuse banks that are configured to store information (e.g., bit information). In some embodiments, the stored information can be bit information of addresses and/or portions of addresses (e.g., row addresses and/or column addresses) associated with defective memory cells. In some embodiments, the bit information are programmed into fuse banks using fuses, latches such as, e.g., DICE, anti-fuses, and/or other types of non-volatile memory. In FIG. 1A, the repair circuit 111 is shown connected to both the row decoder 140 and the column decoder 145. However, in other embodiments, the memory device 100 can include separate row repair and column repair circuit.

Figure 1B:
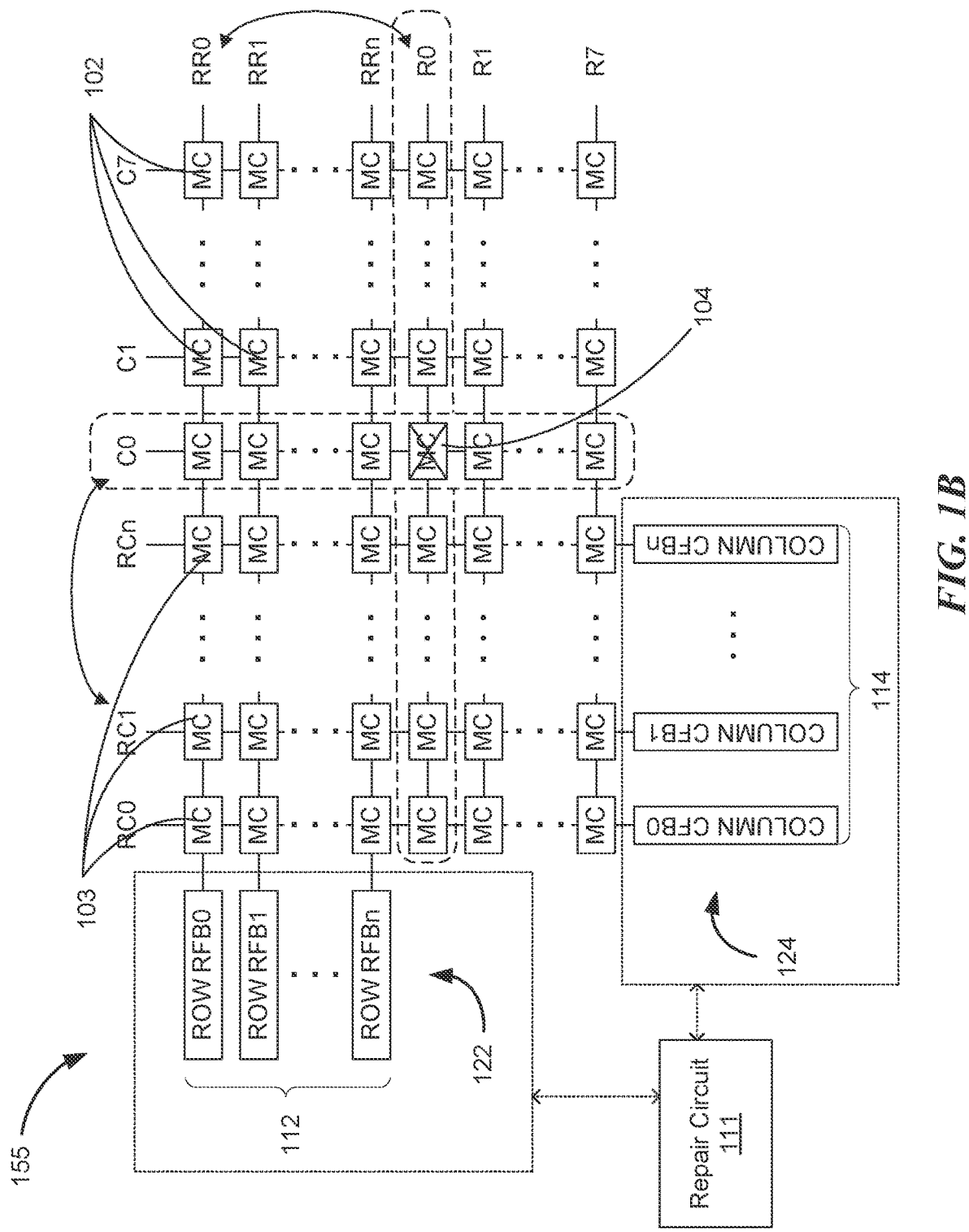
FIG. 1B is a partial block diagram of a memory device including a set of repairable memory cells.

FIG. 1B is a partial block diagram of the memory device 100 showing a memory region 155 and repair circuit 111. The memory region 155 can represent a section of the memory array 150 that includes one or more primary more columns and/or rows and one or more redundant columns and/or rows. For example, a memory region 155 can correspond to the memory device 100, one or more memory arrays 150 in one or more die of the memory device 100, one or more memory banks in a memory array 150, one or more blocks or a portion of a block of memory, a column plane and/or row plane of an array of memory cells, or some other segment or portion of an array of memory cells in a memory device. As seen in FIG. 1B memory region 155 can be configured so as to be repairable. The memory device 100 includes repair circuit 111 coupled to and/or integral with main memory cells 102 of the memory region 155 and configured to repair/replace one or more defective cells 104 within the corresponding set of main memory cells 102. The memory region 155 can include repair or redundant cells 103 that are designated to replace the defective cells 104 based on the logic in repair circuit 111. In other words, the redundant cells 103 are configured to be back up memory cells that are not utilized in normal operations unless they are used to replace actual/main memory cells 102 that have become faulty. The redundant cells 103 are arranged in rows and columns (as, e.g., redundant rows 112 and redundant columns 114) similarly to the main memory cells 102.

In replacing the defective cells 104, the memory device 100 may implement row repairs and/or column repairs. For row repairs, the memory device 100 may deploy and utilize the redundant rows 112 to replace rows including the defective cells 104. As illustrated in FIG. 1B, the memory device 100 may replace row R0, which contains the defective cell 104 therein, with a redundant row RR0. For column repairs, the memory device 100 may deploy and utilize the redundant columns 114 to replace columns including the defective cells 104. As illustrated in FIG. 1, the memory device 100 may replace column C0, which contains the defective cell 104 therein, with a redundant column RC1.

The repair circuit 111 can include fuse banks and/or be coupled to separately located fuse banks with circuitry configured to facilitate the memory cell replacements. Each of the fuse banks for the redundant rows (e.g., RFB0-FBn) and/or the redundant columns (e.g., CFB0 to CFBn) can include a set of fuses, anti-fuses, latches such as, e.g., DICE, and/or or other types of non-volatile memory. The repair circuit 111 can be coupled to a redundant row or a redundant column. As illustrated in FIG. 1B, the fuse banks can include row fuse banks 122 that are each coupled to one of the redundant rows 112 and column fuse banks 124 that are each coupled to one of the redundant columns 114. Each fuse bank (e.g., RFB0-FBn and/or CFB0 to CFBn) is configured to store bit information relating to the addresses of the row/column of defective cells, including the defective cell 104. For example, when a redundant column/row is used to replace a defective column/row, the fuse bank for the corresponding redundant column/row can be programmed (via, e.g., blowing/setting the fuses therein) to store bit information relating to the address of the defective column/row (dashed outline around column/row). If unused, the fuse bank(s) (e.g., RFB0-FBn and/or CFB0 to CFBn) the bit information will remain at and/or be programmed to a default memory address. If a redundant column/row of a fuse bank is programmed with a column/row address of a defective memory cell, a redundant enable circuit 250 (see FIG. 4), which can be part of the repair circuit 111 (or some other circuit), can be programmed to indicate to, for example, an address compare circuit that the redundant column/row should be used rather than the normal memory column/row corresponding to the defective memory cell 104. After the fuse bank of the redundant column/row and the corresponding redundant enable circuit 250 are programmed, the defective column/row in the main memory array 102 of the memory region 155 can be effectively removed from operations of the memory device 100. That is, the redundant column/row is used to store and provide access to data in place of the replaced defective column/row. However, as discussed below, additional checks may be performed to ensure that the redundant column/row address is a valid redundant address. For clarity, embodiments of the present disclosure may be described with respect to repair of individual memory cells. However, those skilled in the art understand that the repair of defective memory cells means using the redundant column and/or row associated with the defective memory cell instead of its normal column and/or row.

Figure 2:
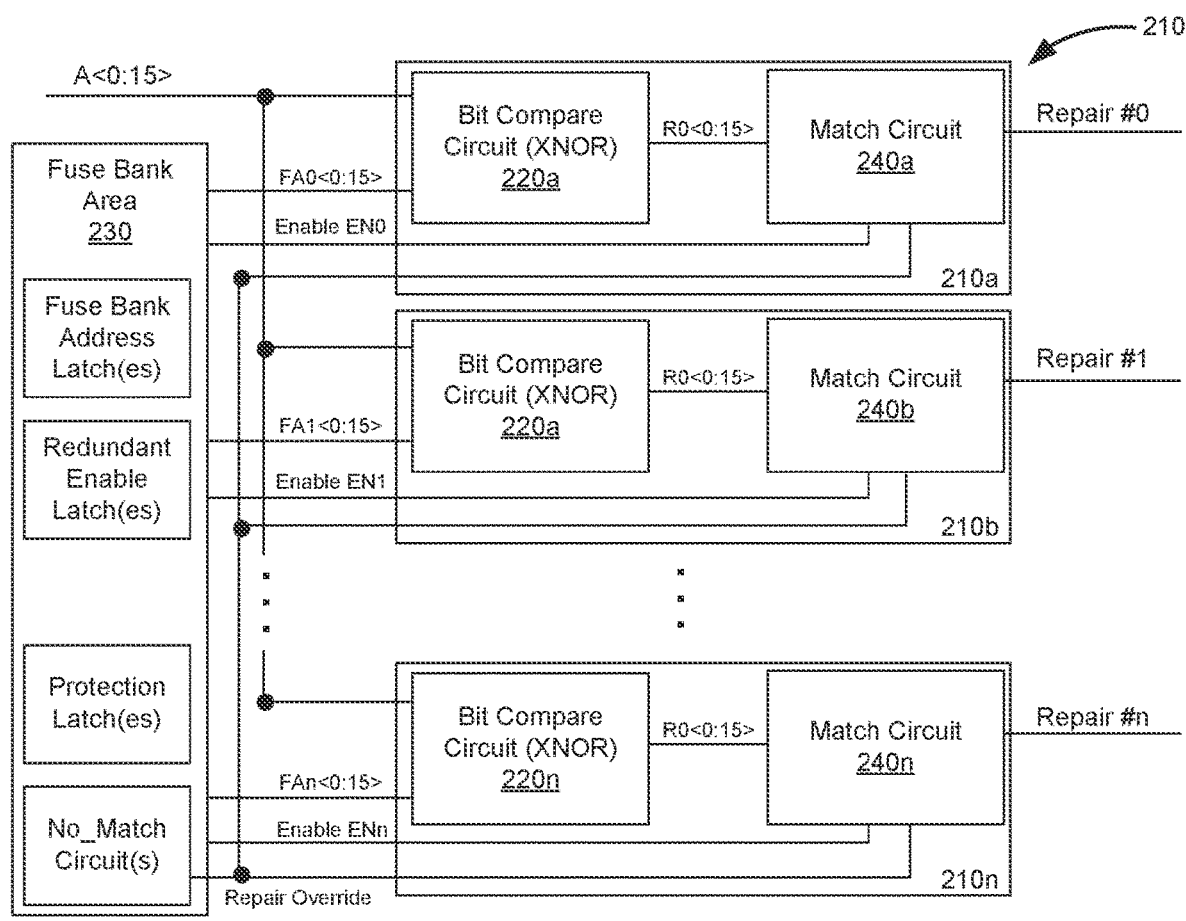
FIG. 2 is a block diagram of a portion of a repair circuit and fuse bank that is in accordance with an embodiment of the present technology.

FIG. 2 illustrates an exemplary compare circuit assembly 210 that can be, for example, part of repair circuit 111. The compare circuit assembly 210 can facilitate repairs of one or more damaged memory cells in one or more memory regions 155 in accordance with an embodiment of the present disclosure. In the illustrated example, compare circuit assembly 210 includes logic circuitry to provide repair signals (e.g., repair signals Repair #0 to #n) for repairing one or more damaged memory rows and/or memory columns in the main memory array 102.

In some embodiments, the repair circuit assembly 210 includes one or more compare circuits 210a to 210n. Each compare circuit 210a-n includes a bit compare circuit 220a-n and a match circuit 24a-n. The bit compare circuits 220a-n receive an external memory address such as, for example, memory cell address A, which corresponds to an address (e.g., row address and/or column address) for memory operations (e.g., read, write, etc.) on a memory cell 102 in memory array 150. Because external memory cell address A can potentially correspond to a defective memory cell (or to a row or column having one or more defective memory cells), a check can be performed and, if defective, the memory cell can be repaired/replaced. The external memory cell address A is transmitted to the bit compare circuits 220a-n from an external system and/or generated internally (e.g., during a refresh procedure). The bit compare circuits 220a-n can respectively receive bit information corresponding to damaged memory cells stored in fuse banks located in fuse bank area 230, which can be part of the repair circuit 111 or located separately. Each fuse bank includes one or more address latch circuits corresponding to the bits of the column and/or row address of the damaged memory cell. Fuse bank configuration is known in the art and thus, for brevity, is not further discussed. In addition to fuse banks, in some embodiments, the fuse bank area 230 can include one or more redundant enable latch circuits (e.g., see FIG. 4, redundant enable latch circuit 250) and/or one or more default address protection latch circuits (e.g., see FIG. 5, protection latch circuit 500) and/or one or more no_match circuits (e.g., see FIG. 6, no-match circuit 600). In other embodiments, one or more of the circuits 250, 500, or 600 can be formed in a location other than the fuse bank area 230. The redundant enable latch circuits and default address protection latch circuits can include one or more fuses, anti-fuses, and/or other non-volatile memory circuit coupled to one or more latches, as discussed further below.

The bit information of the fuse banks can be addresses FA0-n (e.g., FA0, FA1, FA2, .... FAn) or a portion of the respective address FA0-n of the damaged memory cells that is programmed into fuses, anti-fuses, latches such as, e.g., DICE, and/or or other types of non-volatile memory of the fuse bank. The bit compare circuits 220a-n can respectively perform a bit-by-bit comparison (e.g., via XNOR logic) between bits of the external memory cell address A with corresponding bit information FA0-n of the fuse bank to determine if the respective bit value is the same. The number of bits being compared will depend on the configuration of the memory device. In the example of FIG. 2, 16-bit addresses are being compared, but on other embodiments more than 16 bits or less than 16 bits can be compared. In addition, while the bit compare circuits 220a-n of FIG. 2 show bit-by-bit comparisons of the entire 16 bits, in other embodiments, the bit compare circuits 220a-n can be configured to share results of portions of addresses (e.g., consecutive LSB bits) that are common to two or more addresses in order to reduce components, as is known in the art. In exemplary embodiments of the present disclosure, the bit-by-bit comparisons in each of the bit compare circuits 220a-n produce results R0-n (e.g., R0, R1, R2, .... Rn) that are transmitted to respective match circuits 240a-n. The match circuits 240a-n determine if the external memory address A matches the corresponding fuse bank address FA0-n.

As seen in FIG. 2, the match circuits 240a-n receive respective enable signals EN0-n from corresponding redundant enable latch circuits and a common repair override signal from a no_match circuit. When an enable signal EN0-n is set to enable (e.g., set to "0" in the exemplary circuit of FIG. 2) and the repair override signal is set to "no override" (e.g., set to "0" in the exemplary circuit of FIG. 2), the respective match circuit 240a-n determines if the external memory address A matches the corresponding bit information in fuse bank address FA0-n. If so, a state of the corresponding output repair signal Repair #0-n (e.g., Repair #0, Repair #1, Repair #2, .... Repair #n) is set to indicate that the memory cell at external memory address A is defective and the corresponding redundant memory cell should be accessed instead. That is, if the repair signal is in a "repair" state, the external memory address is repaired (that is, memory operations are directed to the redundant memory cell instead of the main memory cell, for example, by selecting a redundant column address and/or redundant row address of the redundant memory cell).

Figure 3:
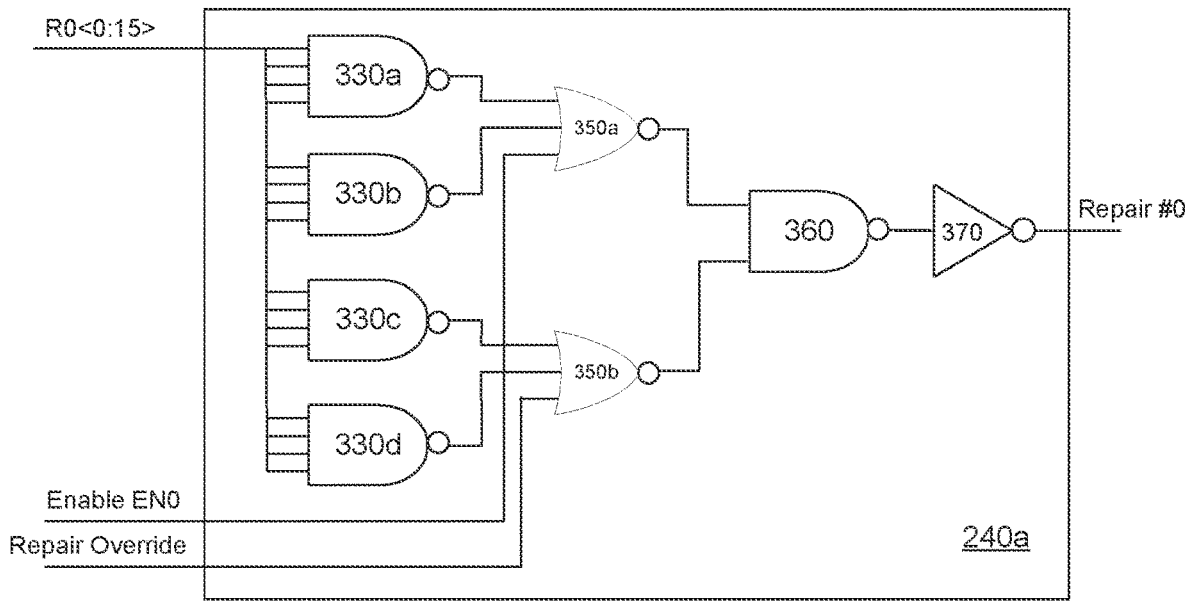
FIG. 3 is a block diagram of a match circuit of a repair circuit in accordance with an embodiment of the present technology.

For example, FIG. 3 illustrates a simplified match circuit in accordance with an embodiment of the present disclosure. For clarity, the function of match circuit of FIG. 3 is described in the context of match circuit 240a. However, those skilled in the art understand that the description is also applicable to the functions of the other match circuits 240b-n. The match circuit 240a includes NAND gates 330a-d and 360, NOR gates 350a,b, and inverter 370. In the exemplary embodiment of FIG. 3, bit comparison results R0<0:15> from the bit comparison circuits 220a are received as inputs to corresponding NAND gates. For example, the sixteen result bits R0<0:15> from bit comparison circuit 220a are received by four 4-input NAND gates 330a-330d. The 4-input NAND gates 330a-d compare the respective bits of input R0 and output respective signals based on the received inputs. In this exemplary embodiment, the output results of the 4-input NAND gates 330a and b are received by a 3-input NOR gate 350a. In addition, the 3-input NOR gate 350a receives an enable signal EN0 as an input. The enable signal EN0, which is output from a redundant enable latch circuit, indicates whether the corresponding fuse bank address FA0 (see FIG. 2) represents a column address and/or a row address of a defective memory cell. If EN0 is set to enable (e.g., EN0 is set to "O" in the exemplary circuit of FIG. 3), then, based on the results of the comparisons in match circuit 240a, the repair signal Repair

0 is either set to indicate a "repair" state (e.g., "1" to repair the external memory address) or set to indicate a "no repair" state (e.g., "0" to use the main column and/or row instead of the redundant column and/or row). If EN0 is not enabled (e.g., EN0 is set to "1" in the exemplary circuit), then the repair signal Repair #0 is set to indicate a "no repair" state regardless of the results of the other comparisons in match circuit 240a.

The output results of the 4-input NAND gates 330c and d are received by a 3-input NOR gate 350b. In addition, the 3-input NOR gate 350a also receives a repair override signal as an input from a no_match circuit. The repair override signal can be used to override a determination of a repair condition. If repair override signal is set to a "no override" state (e.g., the repair override signal is set to "0" in the exemplary circuit of FIG. 3), then, based on the results of the other comparisons in match circuit 240a, the repair signal Repair #0 is either set to indicate a "repair" state (e.g., "1" to repair the external memory address) or set to indicate a "no repair" state (e.g., "0" to use the main column and/or row instead of the redundant column and/or row). If the repair override signal is set to an "override" state (e.g., the repair override signal is set to "1" in the exemplary circuit), then the repair signal Repair #0 is set to indicate a "no repair" state regardless of the results of the other comparisons in match circuit 240a. That is, when set to an "override" state, the repair override signal ensures the match circuit 240a outputs a "no repair" state signal even when the external memory address A matches the fuse address FA0 and the enable signal EN0 indicates the fuse address FA0 corresponds to a defective memory cell.

The outputs of the NOR gates 350a and 350b are received by a 2-input NAND gate 360, which outputs a signal based on the received inputs. The output of the NAND gate 360 is inverted by inverter 370 and then output as a repair signal (e.g., Repair #0). Thus, in the exemplary match circuit 240a, if 1) the bit comparison results R0<0:15> are all "1s" or "ON" indicating that the each bit of external memory address A matches the respective bit of fuse address FA0, 2) the enable signal EN0 is set to "0" or "OFF" indicating that the address FA0 corresponds to a defective memory cell, and 3) the repair override signal is a "0" or "OFF" indicating that no override of comparison results should take place, then the output repair signal Repair #0 has a value of "1" indicating that a repair needs to be performed on the corresponding memory cell (e.g., a repair signal to direct the memory operation to the redundant memory cell instead of the original memory cell, for example, by selecting the redundant row and/or column as discussed above).

The logic for match circuits 240b-n is similar to that of match circuit 240a discussed above. Thus, if 1) the comparisons in the respective match circuits 240b-n results in a match (external memory address A corresponds to a defective memory cell address FA1-n), 2) the respective enable signal EN1-n is set to enable (e.g., value is a "0"), and 3) the repair override signal is set to a no_override state (e.g., a "0"), then the respective match circuit 240b-n outputs a repair signal Repair #1-n on the corresponding signal line to perform a repair (e.g., direct the memory operation to the redundant memory cell instead of the original memory cell, for example, by selecting the redundant row and/or column as discussed above). Conversely, if 1) the comparison does not result in a match (external memory address A does not correspond to a defective memory cell address FA0-n), 2) the respective enable signal EN0-n is not set to enable, or 3) the repair override signal is set to an override state, the respective match circuit 240a-n outputs a repair signal Repair #0-n on the corresponding signal line to direct the memory operation to the original memory cell, for example, by selecting the primary row and/or column.

Figure 4:
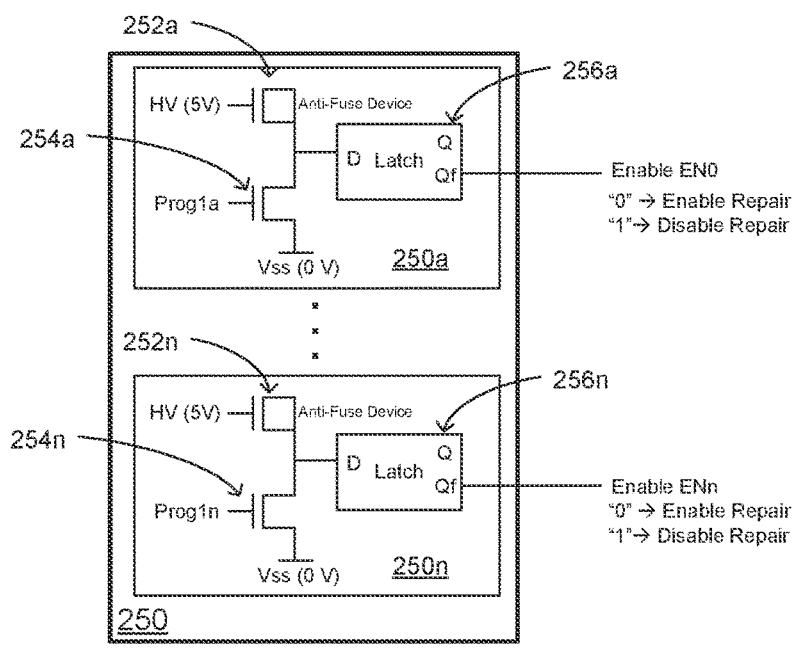
FIG. 4 is a block diagram of an anti-fuse and latch for a redundant enable circuit in accordance with an embodiment of the present technology.

When bit information relating to a defective memory cell is programmed into a fuse bank (e.g., FA0-n), the non-volatile memory (e.g., fuse, anti-fuse, etc.) of a corresponding redundant enable latch circuit can be programmed to indicate that the fuse bank includes an address corresponding to a defective memory cell. Conversely, if the address in the fuse bank (e.g., the default address) does match the column and/or row address of a defective memory cell, then the redundant enable latch circuit is not programmed and the redundant enable latch circuit remains unused. FIG. 4 illustrates an exemplary embodiment of a redundant enable latch circuit that can be used in the memory device 100. The redundant enable latch circuit 250 includes enable latch circuits 250a to 250n that respectively correspond to compare circuits 210a to 210n. Each enable latch circuit 250a-n includes an anti-fuse device 252a-n, a switch device 254a-n, and a latch 256a-n. Of course, circuit designs (e.g., anti-fuse/fuse circuits) other than those illustrated in the exemplary drawings can be used to provide an indication of whether the fuse bank includes an address corresponding to a defective memory cell. As seen in the exemplary embodiment of FIG. 4, the anti-fuse device 252a-n can be a transistor device (e.g., an NMOS device) in which the source and drain are connected and a gate that is connected to high voltage (HV) source (e.g., 5 volts). The drain of the anti-fuse device 252a-n is connected to the drain of switch device 254a-n, which can be a transistor device (e.g., NMOS device). The drain of the anti-fuse device 252a-n is also connected to the input D of the latch 256a-n. A program signal prog1a-n is connected the gate of switch device 252a-n and the source of switch device 252a-n is connected to ground or 0 volts. When bit information corresponding to a column and/or row address of a defective memory cell is programmed into a fuse bank (e.g., during memory diagnostics), the program signal prog1a-n corresponding to the programmed fuse bank is set high to turn on switch device 254a-n and program the anti-fuse device 252a-n. When the switch device 254a-n is on, the gate-oxide of the anti-fuse device 252a-n will breakdown and create a short-circuit due to the high voltage between the gate of anti-fuse device 252a-n and the drain. Once programmed, during initial start-up, the latches 256a-n will read the respective anti-fuse devices 252a-n via input D and set the output Qf, which corresponds to the enable signal EN0-n, to the appropriate value (e.g., in this case a "0" to indicate the redundant column and/or row should be used). If a fuse bank is not programmed with an address of a defective memory cell, the fuse bank remains at and/or is set to a default value and the corresponding enable latch circuit 250a-n remains unused (anti-fuse device 252a-n is not programmed). In the above embodiments, the redundant enable latch circuits include an anti-fuse device and NMOS transistors. However, exemplary embodiments of the present disclosure are not limited to such anti-fuse/latch-type circuits and, in other embodiments, any combination of fuses, anti-fuses, and/or other non-volatile memory latches can be used. In addition, exemplary embodiments are not limited to NMOS circuits and other types of transistors (e.g., PMOS transistors) and/or any combination of transistors can be used with appropriate changes to the circuit. Of course, other types of redundant enable latch circuits can be used so long as they indicate that the corresponding fuse bank includes and/or has been programmed with bit information corresponding to a defective cell.

As discussed above, an unused redundant enable disturb scenario can occur when an unused redundant enable circuit inadvertently flips state and erroneously indicates that the default address in an unused fuse bank corresponds to a defective memory cell. For example, latch disturb events and/or another event can cause an unused redundant enable latch circuit 250a-n to change its state and erroneously indicate that the default address of the corresponding fuse bank FA0-n represents the address of a defective memory device. In such cases, memory operation problems can occur such as, for example, duplicate repairs, customer data being overwritten with garbage data, and/or a failure of the memory die and/or the memory device. A memory cell having a column and/or row address that corresponds to the default memory address of a fuse bank (e.g., a default memory address having all "0s") is typically not repaired in a significant majority of memory die. Accordingly, providing a protection circuit that checks whether the default address of a fuse bank actually represents a repaired address prior to performing a repair is beneficial, and such a protection circuit can protect a significant majority of memory die from an unused redundant enable disturb scenario. Exemplary embodiments of the present disclosure include a default address protection latch circuit that indicates whether the default fuse bank memory address in a predetermined memory region (e.g., memory region 155) represents a repair address. In some embodiments, a single default address protection latch circuit is provided per memory region 155. For example, if the memory region 155 corresponds to a memory die, a single default address protection latch circuit can indicate whether a default fuse bank address in the memory die represents a repaired address. By limiting the number of default address protection latch circuits to one per memory region, the size of the memory device is not increased by any appreciable amount. However, in other embodiments, more than one address protection latch circuit can be provided per memory region 155 (e.g., as redundancy).

Figure 5:
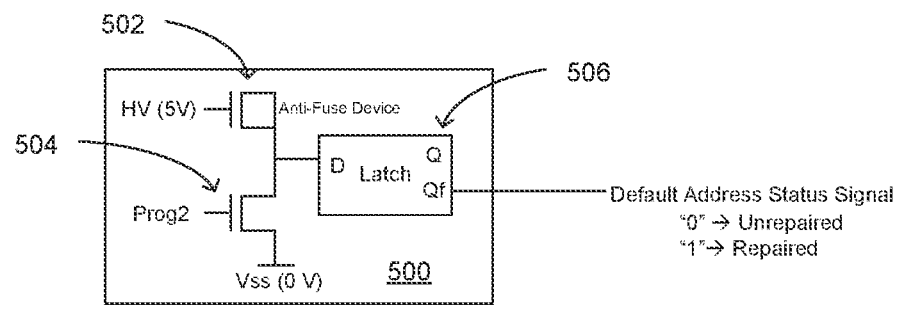
FIG. 5 is a block diagram of a default address repair latch circuit in accordance with an embodiment of the present technology.

FIG. 5 illustrates an exemplary embodiment of a default address protection latch circuit in accordance with an embodiment of the present disclosure. Similar to the enable latch circuit, the default address protection latch circuit 500 includes an anti-fuse device 502, a switch device 502, and a latch 506. Of course, circuit designs (e.g., anti-fuse/fuse circuits) other than those illustrated in the exemplary drawings can be used to provide default address protection. As seen in the exemplary embodiment of FIG. 5, the anti-fuse device 502 can be a transistor device (e.g., NMOS device) in which the source and drain are connected and a gate that is connected to high voltage source (e.g., 5 volts). The drain of the anti-fuse device 502 is connected to the drain of switch device 504, which can be a transistor device (e.g., NMOS device). The drain of the anti-fuse device 502 is also connected to the input D of the latch 506. A program signal prog2 is connected the gate of switch device 504 and the source of switch device 504 is connected to ground or 0 volts. The prog2 signal indicates whether a memory cell address corresponding to a default fuse address has been repaired. For example, after and/or during memory diagnostics for a memory region, a determination can been made as to whether a fuse bank that includes bit information corresponding to an address of a defective memory cell also relates to the default address of the fuse banks in the memory region. If, at the end of the memory diagnostics for the memory region, it is determined that no repair matching the default address of the fuse bank has been made, the prog2 signal can be set to an appropriate state during a time period when anti-fuse device of the default address protection latch is being programmed.

For example, in the exemplary circuit of FIG. 5, if no repair matching the default address of the fuse banks in the memory region has been made, the program signal prog2 corresponding to the memory region 155 can be set high to turn on switch device 504 and program the anti-fuse device 502. When the switch device 504 is on, the gate-oxide of the anti-fuse device 502 will breakdown and create a short-circuit due to the high voltage (HV) between the gate of anti-fuse device 502 and the drain. Once programmed, during initial start-up, the latch 506 will read the anti-fuse device 502 via input D and, based on the reading, set the output Qf, which corresponds to the default address status signal, to the appropriate value based on whether there is a fuse bank that is storing bit information that corresponds to both the default address of the fuse banks for the memory region and an address of a memory cell that is defective. For example, if a fuse bank in the memory region 155 is storing bit information that corresponds to both the default address and an address of a memory cell that is defective, the default address protection latch circuit will output a default address status signal having a value of "1" to indicate the default address for the memory region 155 was repaired. If no fuse bank in the memory region 155 is storing bit information that corresponds to both the default address of the fuse banks and an address of a memory cell that is defective, the default address protection latch circuit will output a default address status signal having a value of "0" to indicate the default address for the memory region 155 was not repaired. In the above embodiments, the default address protection latch circuit 500 includes an anti-fuse device and NMOS transistors. However, exemplary embodiments of the present disclose are not limited to such anti-fuse/latch-type circuits and, in other embodiments, any combination of fuses, anti-fuses, and/or other non-volatile memory latches can be used. In addition, exemplary embodiments are not limited to NMOS circuits and other types of transistors (e.g., PMOS transistors) and any combination of transistors can be used with appropriate changes to the circuit. Of course, other types of default address protection latch circuits can be used so long as they indicate whether a fuse bank in the memory region is storing bit information that corresponds to both the default address of the fuse banks and an address of a memory cell that is defective. For example, the default address protection latch circuit can include a DICE configuration if a more robust latch circuit is desired. Because only one such DICE circuit per memory region is needed, any increase in size and complexity of the memory device logic is negligible.

Figure 6:
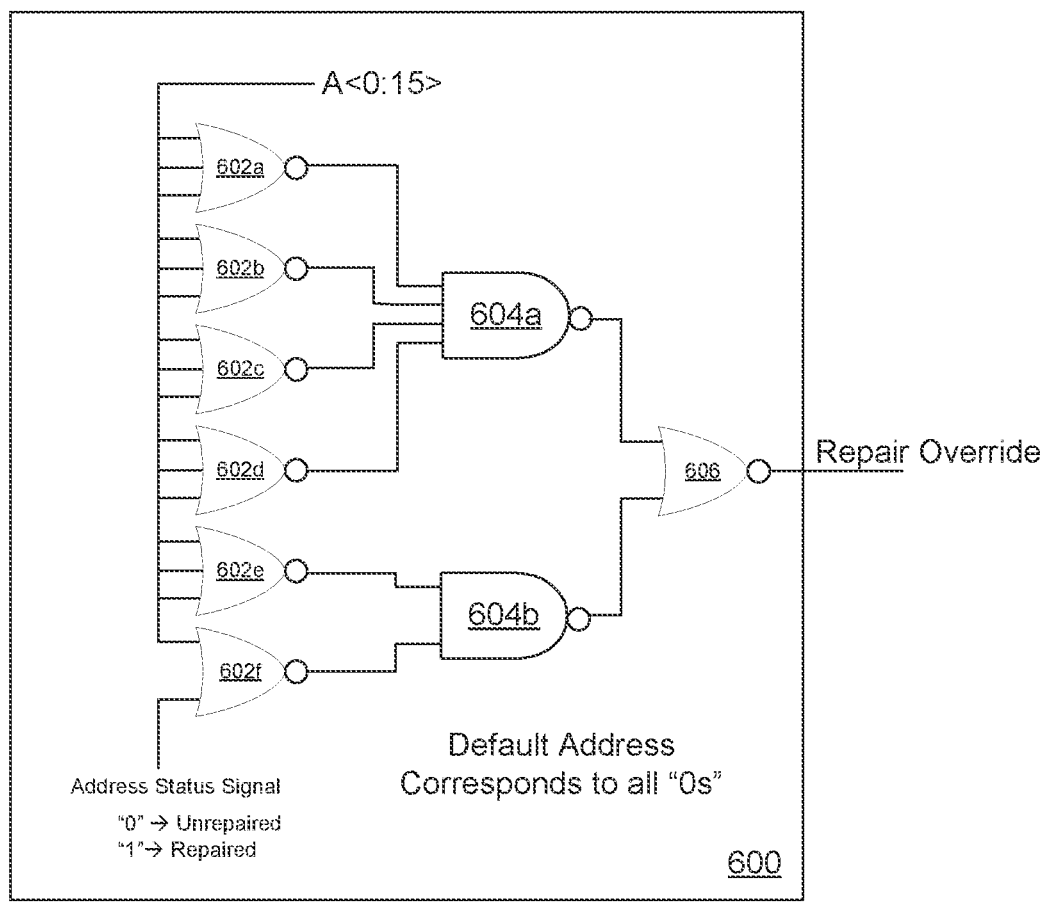
FIG. 6 is a block diagram of a No_Match circuit in accordance with an embodiment of the present technology.

In some embodiments, a circuit can receive the default address status signal from the default address protection circuit 500 and determine whether a potential repair signal from the match circuits 240a-n should be overridden to prevent an erroneous repair of a main memory cell having a column and/or row address matching the default address of the fuse bank. For example, when external memory address A, which is input to the match circuits 240a-n, corresponds to the default address of the fuse bank and external memory address A was not repaired for that memory region, a no_match circuit can be configured to output a repair override signal (e.g., having a value of "1") to force the repair signal from match circuits 240a-n into a "no repair" state (e.g., Repair #0-n having an output value of "0"). FIG. 6 illustrates an exemplary embodiment of a no-match circuit that can output a repair override signal that forces the output of the match circuits 240a-n to a "no repair" state. The no_match circuit 600 includes NOR gates 602a-f that accept the 16-bit external memory address A. In addition, NOR gate 602f also accepts an address status signal, which can be the default address status signal output from default address protection latch circuit 500 or the address status signal output from the default address protection/PPR circuit 700 (discussed below). The outputs of the NOR gates 602a-d are input to a 4-input NAND gate 604a and the outputs of NOR gates 602e,f are input to a 2-input NOR gate 606. As seen in FIG. 6, the no_match circuit 600 is configured for a scenario where the default address is all "0s" for a fuse bank. When all the inputs to the NOR gates 602a-f are "0s" (corresponding to a scenario where the default address of the fuse banks is "0s" and the "0" address in the main memory region has not been repaired), the output repair override signal is a "1" to force the match circuits 240a-n into a "no repair" state. Those skilled in the art recognize that, for scenarios where the default address is all "1s" or a combination of "1s" and "0s," the configuration of the no_match circuit will need to change appropriately. For example, if the default address of the fuse banks is all "1s" then the NOR gates of FIG. 6 can be replaced with NAND gates and the NAND gates of FIG. 6 can be replaced with NOR gates. In this case, the "unrepaired" state of the default address status signal from default address protection latch circuit 500 should be a "1" or inverted to a "1." In some embodiments, in addition to the unused redundant enable disturb scenario discussed above, the repair override signal can be used to set match circuit 240a-n to a "no repair" state in other scenarios such as, for example, when diagnostics and/or other testing is being performed on the memory device.

In some embodiments, a post package repair (PPR) can be performed (e.g., by a customer) to detect and repair defective memory cells. In such embodiments, the memory device can be configured to disable the default address protection circuit and/or the no_match circuit if a PPR is performed on a memory cell having an address corresponding to the default address of the fuse bank. For example, a fuse, anti-fuse, or other circuit can be included the default address protection circuit and/or the no_match circuit to ensure the repair override signal is always a "0" if a PPR is performed on a column and/or row at any address in the memory region or at only a default address of the memory region.

Figure 7:
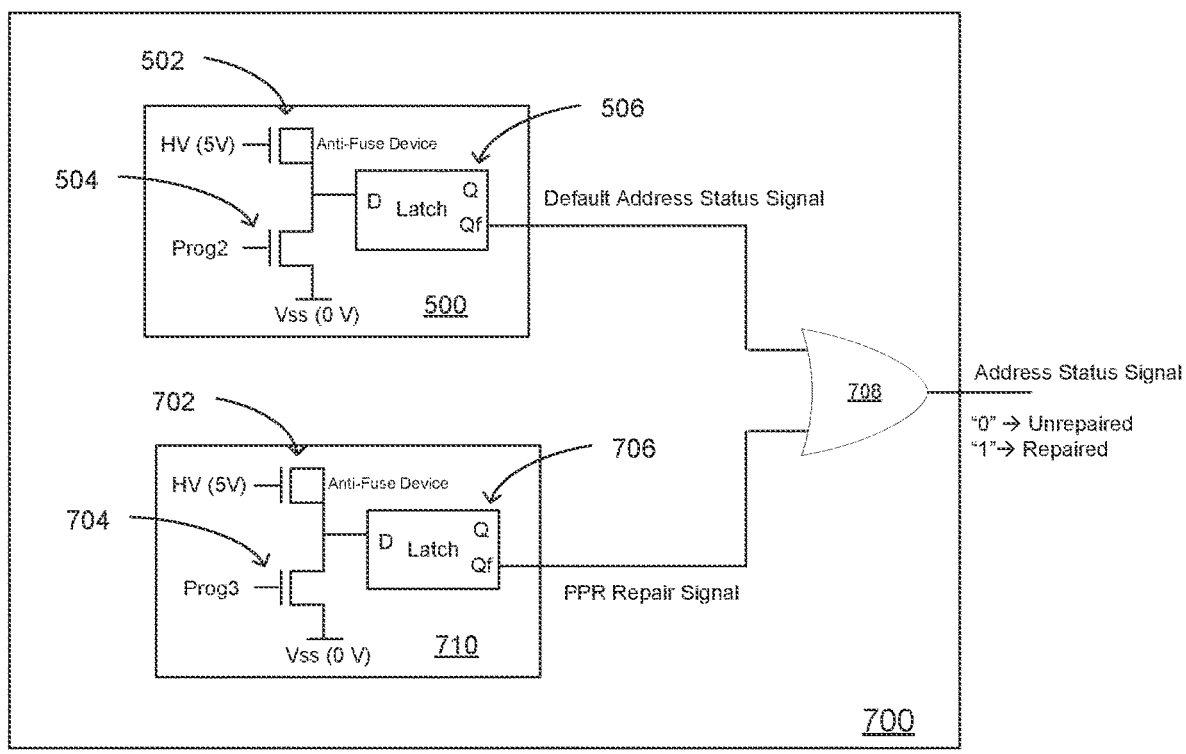
FIG. 7 is a block diagram of a default address protection/post package repair circuit in accordance with an embodiment of the present technology.

In some embodiments, if a PPR is performed on any column and/or row address in the memory region, the repair override signal is set to be always a "0." FIG. 7 illustrates an exemplary embodiment of a default address protection/PPR circuit 700 that includes the default address protection circuit 500 (discussed above) and PPR latch circuit 710 in accordance with an embodiment of the present disclosure. Similar to the above latch circuits, the PPR latch circuit 710 includes an anti-fuse device 702, a switch device 702, and a latch 706. Of course, circuit designs (e.g., anti-fuse/fuse circuits) other than those illustrated in the exemplary drawings can be used to provide PPR indication. As seen in the exemplary embodiment of FIG. 7, the anti-fuse device 702 can be a transistor device (e.g., NMOS device) in which the source and drain are connected and a gate that is connected to high voltage source (e.g., 5 volts). The drain of the anti-fuse device 702 is connected to the drain of switch device 704, which can be a transistor device (e.g., NMOS device). The drain of the anti-fuse device 702 is also connected to the input D of the latch 706. A program signal prog3 is connected the gate of switch device 704 and the source of switch device 704 is connected to ground or 0 volts. The prog3 signal indicates whether bit information corresponding to a column and/or row address of any defective memory cell in the memory region has been programmed into a fuse bank as part of a PPR procedure. If so, the prog3 signal is set high to turn on switch device 704 and program the anti-fuse device 702 to indicate that a memory address has been repaired as part of a PPR procedure. The respective outputs of the default address protection circuit 500 and the PPR latch circuit 710 are input to an OR gate 708. If the default memory address of the memory region has been repaired (e.g., as part of the initial memory diagnostics) or if any column/row address of a defective memory cell for the memory region has been repaired as part of a PPR procedure, the output address status signal of the OR gate 708 will be a "1" to indicate that that a repair has been done. The address status signal from the OR gate 708 can be output to the no_match circuit 600. If the output address status signal is a "1," then the no_match circuit 600 outputs a repair override signal that is always a "0."

In some embodiments, the prog3 signal programs the PPR latch circuit 710 only when the default address for the memory region has been repaired as part of the PPR procedure. Thus, in this embodiment, a PPR to a column/row address other than the default memory address will not trigger a programming of the PPR latch circuit 710. However, if the PPR is made to the default address, then the PPR latch circuit 710 is programmed. In this embodiment, the no_match circuit 600 outputs a repair override signal only when the default address has been repaired either initially or as part of the PPR procedure. Of course, circuit designs other than those illustrated in the drawings can be used to indicate post package repairs corresponding to any memory address and/or to only a default memory address.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of DRAM devices. Apparatuses configured in accordance with other embodiments of the present technology, however, can include other types of suitable storage media in addition to or in lieu of DRAM devices, such as, devices incorporating NAND-based or NOR-based non-volatile storage media (e.g., NAND flash), magnetic storage media, phase-change storage media, ferroelectric storage media, etc. The above embodiments are described in sufficient detail to enable those skilled in the art to make and use the embodiments. A person skilled in the relevant art, however, will understand that the technology may have additional embodiments and that the technology may be practiced without several of the details of the embodiments described above.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those of ordinary skill in the relevant art will recognize. For example, although steps may be presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. For example, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." Additionally, the terms "comprising," "including," "having," and "with" are used throughout to mean including at least the recited feature(s) such that any greater number of the same feature and/or additional types of other features are not precluded.

It will also be appreciated that various modifications may be made without deviating from the disclosure. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described.

We claim:

1. A memory device, comprising:
a plurality of fuse banks for a memory region, each fuse bank storing bit information that relates to at least one of a default address for the plurality of fuse banks or an address of a memory cell that is defective; and
a default address protection circuit configured to provide a default address status signal indicating whether a fuse bank in the plurality of fuse banks is storing bit information that corresponds to both the default address and an address of a memory cell that is defective.

2. The memory device of claim 1, further comprising:
a no_match circuit configured to receive an external memory address for memory operations and the default address status signal from the default address protection circuit,
wherein the no_match circuit is configured to output a repair override signal that indicates whether to override a repair of the external memory address, and
wherein the repair signal indicates to override the repair if the external address matches the default address and if the default address status signal indicates that no fuse bank in the plurality of fuse banks is storing bit information that corresponds to both the default address and an address of a memory cell that is defective.

3. The memory device of claim 2, wherein the no_match circuit is configured for a default address that includes at least one of the following:
all "0" bits and the repair override signal is output when the external address includes all "0" bits,
all "1" bits and the repair override signal is output when the external address includes all "1" bits or
a combination of "0" bits and "1" bits and the repair override signal is output when the external address matches the combination.

4. The memory device of claim 2, further comprising:
a plurality of redundant enable circuits, each redundant enable circuit corresponding to a fuse bank of the plurality of fuse banks and configured to determine whether the corresponding fuse bank represents an address of a defective memory cell and set a value of an output signal based on the determination,
wherein each redundant enable circuit is configured to output an enable signal indicating whether the corresponding fuse bank represents the address of a defective memory cell.

5. The memory device of claim 4, further comprising:
a plurality of compare circuits corresponding to respective fuse banks of the plurality of fuse banks and respective redundant enable circuits of the plurality of redundant enable circuits,
wherein each compare circuit is configured to compare the external memory address with the stored bit information of the corresponding fuse bank, and
wherein each compare circuit is configured to receive the enable signal and the repair override signal and provide a repair signal to repair the external memory address when the external memory address matches the stored bit information, if the repair override signal indicates not to override the repair, and if the enable signal indicates that the corresponding fuse bank represents the address of a defective memory cell.

6. The memory device of claim 2, wherein at least one of the default address protection circuit or the no_match circuit is disabled if an external address of a defective memory cell is repaired as part of a post package repair (PPR).

7. The memory device of claim 2, wherein at least one of the default address protection circuit or the no_match circuit is disabled only if an external address of a defective memory cell that is repaired as part of a post package repair (PPR) corresponds to the default address.

8. The memory device of claim 1, wherein the default address protection circuit includes an anti-fuse device connected to a latch circuit, and
wherein the anti-fuse device is programed to conduct when no fuse bank in the plurality of fuse banks is storing bit information that corresponds to both the default address and an address of a memory cell that is defective.

9. The memory device of claim 1, wherein memory region corresponds to one or more memory arrays in a memory die, one or more memory banks in a memory array, one or more blocks of a memory array, a portion of a block of a memory array, a column plane of a memory array, or a row plane of memory array.

10. A method, comprising:
storing bit information that relates to at least one of a default address for a plurality of fuse banks for a memory region of a memory device or an address of a memory cell that is defective in the memory device;
providing a default address status signal indicating whether a fuse bank in the plurality of fuse banks is storing bit information that corresponds to both the default address and an address of a memory cell that is defective.

11. The method of claim 10, further comprising:
overriding a repair of an external memory address for memory operations in the memory device if the external memory address matches the default address and if the default address status signal indicates that no fuse bank in the plurality of fuse banks is storing bit information that corresponds to both the default address and an address of a memory cell that is defective.

12. The method of claim 11, wherein the method include at least one of the following:
if the default address includes all "0" bits, the overriding of the repair occurs when the external address includes all "0" bits,
if the default address includes all "1" bits, the overriding of the repair occurs when the external address includes all "1" bits, or
if the default address includes a combination of "0" bits and "1" bits, the overriding of the repair occurs when the external address matches the combination.

13. The method of claim 10, wherein a default address protection circuit in the memory device provides the default address status signal.

14. The method of claim 13, wherein the default address protection circuit includes an anti-fuse device connected to a latch circuit, and
wherein the anti-fuse device is programed to conduct when no fuse bank in the plurality of fuse banks is storing bit information that corresponds to both the default address and an address of a memory cell that is defective.

15. The method of claim 10, further comprising:
comparing an external memory address for memory operations with respective stored bit information in each fuse bank of the plurality of fuse banks to determine if the external memory address matches the respective stored bit information; and
providing a repair signal to repair the external memory address when the external memory address matches the respective stored bit information and the respective stored bit information corresponds to an address of a memory cell that is defective.

16. A memory device, comprising:
a memory region having an array of memory cells;
a plurality of fuse banks for the memory region, each fuse bank storing bit information corresponding to at least one of a default address or an address of a defective memory cell in the array of memory cells;
a plurality of compare circuits corresponding to respective fuse banks of the plurality of fuse banks, each compare circuit configured to compare an external memory address for memory operations with the respective stored bit information and to determine whether the external memory address needs to be repaired based on the comparison; and
a default address protection circuit configured to indicate whether a memory cell having a default address of a fuse bank has been repaired in the memory region.

17. The memory device of claim 16, further comprising:
a no_match circuit configured to receive the external memory address for memory operations and the indication from the default address protection circuit,
wherein the no_match circuit is configured to output a repair override signal to the plurality of compare circuits, the repair override signal indicating to override a repair of the external memory address if the external address matches the default address and if the indication from the default address protection circuit indicates that no fuse bank in the plurality of fuse banks is storing bit information that corresponds to both the default address and an address of a memory cell that is defective.

18. The memory device of claim 17, wherein the determination of whether the external memory address needs to be repaired is further based on an enable signal that indicates whether the corresponding stored bit information represents an address of a defective memory cell.

19. The memory device of claim 18, wherein each compare circuit receives the enable signal and the repair override signal and outputs a repair signal to repair the external address when the external memory address matches the corresponding stored bit information, the repair override signal indicates not to override the repair, and the enable signal indicates that the corresponding stored bit information represents an address of a defective memory cell.

20. The memory device of claim 16, wherein the default address protection circuit includes an anti-fuse device connected to a latch circuit, and
wherein the anti-fuse device is programed to conduct when no fuse bank in the plurality of fuse banks is storing bit information that corresponds to both the default address and an address of a memory cell that is defective.

* * * * *